United States Patent
Fantini et al.

(10) Patent No.: US 9,441,361 B2
(45) Date of Patent: Sep. 13, 2016

(54) COMPOSITION FOR THE THERMAL INSULATION OF BUILDING WALL SURFACES AND APPLICATION PROCESS THEREOF

(71) Applicant: Stefania Fantini, Castiglione di Cervia (IT)

(72) Inventors: Stefania Fantini, Castiglione di Cervia (IT); Mario Luigi Melzi, Cernusco sul Naviglio (IT)

(73) Assignee: Stefania Fantini, Castiglione di Cervia (IT)

( * ) Notice: Subject to any disclaimer, the term of this patent is extended or adjusted under 35 U.S.C. 154(b) by 0 days.

(21) Appl. No.: 14/778,691

(22) PCT Filed: Mar. 16, 2014

(86) PCT No.: PCT/IB2014/000347
§ 371 (c)(1),
(2) Date: Sep. 21, 2015

(87) PCT Pub. No.: WO2014/147462
PCT Pub. Date: Sep. 25, 2014

(65) Prior Publication Data
US 2016/0047118 A1    Feb. 18, 2016

(30) Foreign Application Priority Data

Mar. 21, 2013 (IT) .............. MI2013A0430

(51) Int. Cl.
C09D 5/34 (2006.01)
E04B 1/78 (2006.01)
C09D 7/12 (2006.01)
E04B 1/74 (2006.01)
E04B 1/76 (2006.01)

(52) U.S. Cl.
CPC . E04B 1/78 (2013.01); C09D 5/34 (2013.01); C09D 7/125 (2013.01); C09D 7/1216 (2013.01); C09D 7/1241 (2013.01); C09D 7/1275 (2013.01); C09D 7/1283 (2013.01); C09D 7/1291 (2013.01); E04B 1/74 (2013.01); E04B 1/762 (2013.01); E04B 2001/745 (2013.01); Y02B 30/94 (2013.01)

(58) Field of Classification Search
CPC .. C09D 5/34; C09D 7/12316; C09D 7/1241; C09D 7/125; C09D 7/1275; C09D 7/1283; C09D 7/1291
See application file for complete search history.

(56) References Cited

U.S. PATENT DOCUMENTS 3,176,354 A * 4/1965 Blau ................ C04B 26/02
252/62
2007/0098973 A1  5/2007 Wagner

FOREIGN PATENT DOCUMENTS

EP    0808953 A1    11/1997
WO    2010/002934 A2    1/2010

OTHER PUBLICATIONS

D. K. Panesar et al.: "The mechanical, transport and thermal properties of mortar and concrete containing waste cork," Cement and Concrete Composites, vol. 34, No. 9, Oct. 1, 2012, pp. 982-992, XP055088208, ISSN: 0958-9465; 12 pgs.
L. Gil: "Cork composites: a review," Materials, vol. 2, No. 3, Jun. 16, 2009, pp. 776-789, XP002716320, ISSN: 1996-1944; 14 pgs.
International Search Report issued May 8, 2014 in corresponding PCT/IB2014/000347; 3 pgs.

* cited by examiner

Primary Examiner — Anthony J Green
(74) Attorney, Agent, or Firm — Maier & Maier, PLLC

(57) ABSTRACT

A product composition that, suitably dispersed in paints or mixed in building products, allows to improve the thermal insulation of the building wall surfaces, is described. The application process of said composition, for the thermal insulation of wall surfaces, is also described.

6 Claims, No Drawings

COMPOSITION FOR THE THERMAL INSULATION OF BUILDING WALL SURFACES AND APPLICATION PROCESS THEREOF

SHORT DESCRIPTION OF THE INVENTION

The object of the present invention is represented by a composition able to improve the thermal insulation of the building wall surfaces and by the process for its application. More specifically, by the use of the composition of the invention, it is possible to considerably reduce the thermal losses through the wall surfaces: applications of said compositions to the wall surfaces considerably reduce the thermal losses compared to those wall surfaces that did not undergo any treatment.

The environmental pollution, and the consequent greenhouse effect, has become more and more worrying and, in the last decades, it pushed the technology to develop methods capable to reduce as much as possible the energy consumptions, particularly of the energy based on the combustion of fossil fuels. One of the components of the energy consumption, that gives rise to negative effects on the environment, is the one connected to the building heating, particularly in the coldest countries of the north and the south of the terrestrial hemispheres and anyway in all the countries during the coldest months.

BACKGROUND OF THE INVENTION

Particularly in the last decades the thermal losses of the building heating were aimed to be reduced by coating their wall surfaces with panels made of material non-heat conductor, either synthetic material such as, e.g. polystyrene, or natural material such as, e.g., rock wool. These panels are placed adherent against the building wall surfaces, either on the outer side or on the inner building side and they form an insulation system that in the Italian jargon is called "cappotto" (coat).

The "cappotto", carried out on the building inner or outer walls, is formed by panels of non-heat conductor, insulating material, sticked to the wall surface, on which a net of plastic material or a sheet of tar paper is carefully laid down and then a plaster layer, in turn covered by a thinner layer of plaster finish, i.e. a plaster having a thinner layer. The thickness of the "cappotto", depending on its structure, can vary from 5 to more centimeters. On the elements forming the "cappotto", a suitable layer of painting product of the desired colour is finally applied.

The insulation method by means of the "cappotto" application can be carried out either on new construction buildings or on existing buildings. This system had a positive result as concerns the heat losses from the buildings, which are reduced, but showed some inconveniences, such as:
  the wall surfaces, formed with a "cappotto" covering, are mechanically weak: they are scarcely resistant to the knocks and little suitable to be loaded with objects of heavy weight. In case of "cappotto" carried out on the inner side, it can be uncertain that they may hold up objects such as pictures or lamps;
  structural modifications always become necessary in case of inner "cappotto", because of the changes of the walls as regards thresholds, frames, corners;
  the insulation material does not allow the wall surface to breathe and therefore a humidity increase inside the building takes place with consequent mould formation, so causing compulsory the carrying out of openings for the air transit from outside;
  difficulties of installation in historical city-centres, particularly as regards the carrying out of a "cappotto" on the building outer surface;
  long time application and, consequently, high costs, furthermore, and of particular importance:
  the toxic effect due to the degradation that takes place, in time, of the materials forming the insulating panels: this is valid for the polystyrene, that can lead, in time, to cancerogenic monomers as well as for the rock wool, that can form, in time, fibrous material;
  difficult disposal of said insulating materials at the end of their life, that is, in the average, longer than ten years from their production.

More recently thermal paints have been studied and produced that contain hollow ceramic microspheres.

The use of said paints to a wall surface does not reduce the thermal conductivity, but it limits the heat transit through the wall surface because of the thermal reflectance, even if the thermal conductivity is reduced in a relatively modest measure. This last solution provides, however, good results being the applied paint in a limited thickness and not involving the presence of potentially toxic materials.

DESCRIPTION OF THE INVENTION

The object of the present invention is represented by a composition of products that, suitable dispersed in paints or mixed with suitable building products, allows the superficial treatment of the building wall surfaces carrying out an excellent and lasting thermal insulation of the same buildings. Said composition is mainly composed by natural compounds; all its components are not toxic and of easy availability and do not present any disposal problem at their end life. Said composition is provided with an insulating effect that neither reduces nor changes in time. The components of said insulating composition are represented by the natural substances reed and cork, by hollow ceramic microspheres, by pyrogenic silica and hydroxyethylcellulose. Reed and cork are present in the composition in a finely broken form, preferably as powder of different particle size suitable to be appropriately dispersed, with suitable amounts of pyrogenic silica, hydroxyethylcellulose and hollow ceramic microspheres in paints or in building products such as, e.g. shim, slaked lime, marbling, plaster, plaster finish, shimming and the like. In case the composition is applied to the wall surfaces dispersed in a paint, a suitable particle size of the natural components, reed and cork, is lower than 0.1 mm, while, in case the composition is applied to the wall surfaces dispersed in shim, shimming, plaster finish, plaster and similar building products, a suitable particle size can vary from 0.1 mm to 3 mm.

In the composition of the invention the intensity of the insulating effect results increased when the single components are present in an amount that varies within specific limits: the reed is present in an amount from 0.1% to 45% b.w. referred to the total weight of the composition; precisely, in case the insulating composition is dispersed in the painting product, the reed is contained in said composition in an amount from 0.1% to 20% b.w. referred to its total weight and, in case the insulating composition is dispersed in the plaster finish or in similar building products, the reed is contained in said composition in an amount from 5% to 45% b.w. referred to its total weight; the cork is present in an amount from 0.1% to 45% b.w. referred to the total weight of the composition; precisely, in case the insulating composition is dispersed in the painting product, the cork is contained in said composition in an amount from 0.1% to 20% b.w. referred to its total weight and, in case the insulating composition is dispersed in the plaster finish or in similar building products, the cork is contained in said composition in an amount from 5% to 45% b.w. referred to its total weight; the hollow ceramic microspheres are present in an amount from 2.5% to 95% b.w. referred to the total weight of the composition; precisely, in case the insulating composition is dispersed in the painting product, the hollow ceramic microspheres are, preferably, contained in said composition in an amount from 50% to 95% b.w. referred to its total weight and, in case the insulating composition is dispersed in the plaster finish or in similar building products the hollow ceramic microspheres are, preferably, contained in said composition in an amount from 2.5% to 15% b.w. referred to its total weight; the pyrogenic silica is present in an amount from 0.1% to 20% b.w. referred to the total weight of the composition; precisely, in case the insulating composition is dispersed in the painting product, the pyrogenic silica is contained in said composition in an amount from 0.1% to 10% b.w. referred to its total weight and, in case the insulating composition is dispersed in the plaster finish or in similar building products, the pyrogenic silica is contained in said composition in an amount from 0.1% to 20% b.w. referred to its total weight; the hydroxyethylcellulose is present in an amount from 0.1% to 20% b.w. referred to the total weight of the composition; precisely, in case the insulating composition is dispersed in the painting product, the hydroxyethylcellulose is contained in said composition in an amount from 0.1% to 15% b.w. referred to its total weight and, in case the insulating composition is dispersed in the plaster finish or in similar building products, the hydroxyethylcellulose is contained in said composition in an amount from 0.1% to 20% b.w. referred to its total weight.

A further object of the invention is constituted by the application of the above mentioned insulating composition that consists in the application of said composition to the wall surface suitably dispersed and mixed in suitable painting products or in suitable building products in different amounts and percentages, preferably, in two consecutive treatments. The different components of the insulating composition, suitably mixed each other in different amounts and on different support materials, either painting products or building products, define different behaviours of the applied material layer: the first treatment produces a strong increase of the thermal resistance, while the following second treatment produces a strong thermal reflectance together with a thermal resistance increase.

A high insulating effect is therefore produced, essentially due to the concomitant action of the thermal conductivity decrease, or thermal resistance increase, together with a thermal reflectance action.

The treated surfaces can be obtained in the desired colours either the lighter ones, generally requested for the residences, or the brighter ones with special colours, generally requested for public places, such as bars and other meeting places.

A surprising result obtained by treating the wall surfaces with the composition of the invention, suitably dispersed in paints or other building products, consists in that inside the treated room the thermal gradient, minimum temperature at the floor and maximum temperature at the ceiling, is drastically reduced.

More precisely, in case the composition of the invention is dispersed in normal trade paints, of a desired colour, the resulting dispersion can be applied, by two different treatments, having different percentages of the single components, to the inner or outer wall surface, which can belong either to a new building or to an existing one and can be either a surface without any insulating device or a surface already provided with a "cappotto" or a paint. The particle size of the components of the composition, particularly for reed and cork, is necessarily lower than 0.1 mm to obtain a good dispersion in the painting product, usually applied by roll or brush, so eliminating possible negative aesthetic effects.

For the first hand the mixture of the components b.w. is formed by:

| | |
|---|---|
| reed powder | from 0.1% to 20% |
| cork powder | from 0.1% to 20% |
| hollow ceramic microspheres | from 50% to 75% |
| pyrogenic silica | from 0.1% to 5% |
| hydroxyethylcellulose | from 0.1% to 10% and | for the second hand, the composition b.w. is formed by:

| | |
|---|---|
| reed powder | from 0.1% to 5% |
| cork powder | from 0.1% to 5% |
| hollow ceramic microspheres | from 50% to 95% |
| pyrogenic silica | from 0.1% to 1% |
| hydroxyethylcellulose | from 0.1% to 1% |

The compositions are added in the first and second hand in b.w. ratios from 2% to 15%, being said percentages referred to the amount of insulating composition in respect to the amount of the used painting product.

In the following, the formulations of some compositions of the invention are given with the purpose to better illustrate it, without however limiting the scope thereof.

EXAMPLE 1

The insulating composition dispersed in a painting product formed by the components b.w.

| | | |
|---|---|---|
| first hand: | reed powder | 14.0% |
| | cork powder | 14.0% |
| | hollow ceramic microspheres | 65.0% |
| | pyrogenic silica | 1.0% |
| | hydroxyethylcellulose | 6.0% |
| second hand: | reed powder | 3.0% |
| | cork powder | 3.0% |
| | hollow ceramic microspheres | 93.6% |
| | pyrogenic silica | 0.1% |
| | hydroxyethylcellulose | 0.3% |

The two compositions are added to the amount of paint used in the ratio of 7.6% b.w. in the first hand and of 6% b.w. in the second hand.

EXAMPLE 2

Insulating composition b.w. dispersed in a painting product:

| | | |
|---|---|---|
| first hand: | painting product | 89.8% |
| | reed powder | 2.0% |
| | cork powder | 2.0% |
| | hollow ceramic microspheres | 5.0% |
| | pyrogenic silica | 0.2% |

|  | | |
|---|---|---|
| second hand: | hydroxyethylcellulose | 1.0% |
| | painting product | 94.6% |
| | reed powder | 0.1% |
| | cork powder | 0.1% |
| | hollow ceramic microspheres | 5.0% |
| | pyrogenic silica | 0.1% |
| | hydroxyethylcellulose | 0.1% |

If requested, for an optimization of the wall aesthetic appearance, it is possible to apply a further finishing hand, having the composition b.w. quoted as follows:

| | |
|---|---|
| paint | 95.0% |
| hollow ceramic microspheres | 5.0% |

The application of the first hand, with the dispersion in the painting product of the above shown composition, produces a strong decrease of the thermal conductivity and, inversely, a strong thermal resistance increase.

The application of the second hand, with the dispersion in the painting product of the above shown composition, produces a strong thermal reflectance together with a thermal conductivity decrease and, inversely, a thermal resistance increase.

The insulating capability of a wall surface, lower thermal conductivity and reflectance increase, is proportional to the amount of components added to the painting product in the first and in the second hand. A percentage increase, if any, of the introduced insulating composition amount or, alternatively, an increase of the applied hands, produce an insulating capability improvement.

The contemporaneous application, if any, of the same insulating composition, either on the outside or on the inside of the wall, produces the increase and the sum of the insulating effects, reaching high manufacture insulating forms.

By the treatment above described, differently from the "cappotto", the produced reflectance does not necessarily request a greatest thermal conductivity decrease to obtain a high thermal insulation value.

The treatment with the composition of the invention allows to obtain an efficacious thermal insulation, already checkable a few days after its application, with the definitive elimination, at the same time, of moulds, usually present in the areas relevant to the outside-inside thermal bridges. Said superficial treatment totally eliminates all the negative effects above mentioned relevant to thermal insulation carried out with the "cappotto". More precisely:
  there are no surfaces mechanically weak,
  structural modifications are not necessary as per the "cappotto" added to existing wall surfaces,
  transpiration of the wall surfaces and total mould elimination
  possibility of application on historical manufactures and in city-centres,
  simplicity and shorter application time and consequent good economics,
  possible toxicity decrease,
  no disposal problem In case the composition of the invention is dispersed in normal building products for the formation of plaster, slaked lime, marbling, plaster finish, shimming and the like, the resultant dispersion is applied, optionally even with two different treatments having different percentages of the single components, to the inner or outer wall surface, that may belong either to a new or an existing building and can be either a surface without any insulation device or a surface already provided with "cappotto" or paint.

The insulating composition may be formed, b.w., by:

| | |
|---|---|
| reed powder/granule | from 5.0% to 45.0% |
| cork powder/granule | from 5.0% to 45.0% |
| hollow ceramic microspheres | from 2.5% to 15.0% |
| pyrogenic silica | from 0.1% to 20.0% |
| hydroxyethylcellulose | from 0.1% to 20.0% |

The percentage amount of this mixture, referred to the support material wherein is dispersed, can reach over 80% b.w.

EXAMPLE 3

In the following, a b.w. formulation of an insulating composition to be dispersed in a suitable amount of one of the building products selected among plaster, slaked lime, marbling, plaster finish/shimming, is described:

| | |
|---|---|
| reed powder/granule | 37.0% |
| cork powder/granule | 37.0% |
| hollow ceramic microspheres | 7.0% |
| pyrogenic silica | 13.0% |
| hydroxyethylcellulose | 6.0% |

In order to evaluate the insulating effect of a composition according to the invention some experimental works have been carried out as described in the following.

EXAMPLE 4

The experiment was performed during a day with a cloudy sky and after sunset to avoid any interference due to the solar radiation.

In a house, two perimetral walls of the same room were taken into consideration. The first wall, northwards oriented, was externally treated with a paint containing the composition of the invention, while the second wall, westwards oriented, was treated with the same paint, but without the composition of the invention.

The room was internally heated and the internal temperature measured was 19.5° C.; the external environmental temperature of the room, and of the house, was 1-2° C.

The external temperature of the two walls was measured with a thermocamera FLIR17. The following results were obtained:

| | Temperature ° C. |
|---|---|
| northwards wall treated with the paint containing the composition of the invention | 1-2° C. |
| westwards wall treated with the same paint but without the composition of the invention | 9-10° C. |

The higher temperature of the outside westwards wall, treated only with the paint, evidenced a considerable thermal dispersion, while the temperature of the outside northwards wall, treated with the paint containing the composition of the invention, practically unchanged in respect to the external temperature, clearly evidences the very low thermal dispersion of the wall due to the composition of the invention.

EXAMPLE 5

On a perimetral wall made of bricks, a 8 cm "cappotto" was installed (polystyrene plus plaster) and the thermal dispersion of said composite wall was evaluated. Then the thermal dispersion was evaluated on the same wall, after having removed the "cappotto" and replaced it by a paint containing the composition of the invention. This test clearly demonstrated that on the wall without "cappotto", but treated with the paint containing the composition of the invention, the thermal dispersion was reduced of more than 60% compared to the value of the thermal dispersion obtained on the wall with the "cappotto".

As regards a building product is also possible to carry out a plaster or a plaster finish or a shim directly from their mixture with a simple addition of acrylic resins as binders for anchoring tightness, inerts such as marble powder, quartz, glass, dyes, titanium, mixing oils, such as linseed oil, marseille and others. Generally the particle size of the insulating composition components above described is included between 0.1 mm and 3 mm, obtained by abrasion or grinding of the start substance. It is therefore a particle size that includes not only powders, but also granules being not requested, in the specific case, reduced sizes of the particle size because the product, with which the mixing is made, has inerts of similar sizes and therefore the whole results well mixed for the application and for its final aesthetics.

The higher is the mixture concentration, the higher is the product thermal resistance increase. Varying the mixture percentages, there is the possibility to vary the thermal insulation value. Also varying the ratio among the different components the thermal insulation value can be varied.

The obtained mixture can be applied either at inside or at outside of the buildings. The application of this mixture is carried out by shim.

By mixing the above mixture with the plaster finish blend a high thermal insulation value is obtained; in case of plaster the value is higher because the two products are applied with different thicknesses.

By the treatment of the wall surfaces as above, to obtain a very good thermal insulation, all the above indicated advantages for the treatment method with painting products, are obtained.

The invention claimed is:

1. A composition able to improve the thermal insulation of building wall surfaces, comprising:
  a plurality of natural products, including at least reed and cork in a crumbled form, mixed with pyrogenic silica, hydroxyethylcellulose and hollow ceramic microspheres, said components being present in the composition in the ratios: reed and cork are, each of them, independently, comprising in the composition in an amount from 0.1% to 45% b.w. referred to the composition total weight; the hollow ceramic microspheres are included in the composition in an amount from 2.5% to 95% b.w. referred to the composition total weight; the pyrogenic silica is included in the composition in an amount from 0.1% to 206% b.w. referred to the composition total weight; hydroxyethylcellulose is included in the composition in an amount from 0.1% to 20% b.w. referred to the composition total weight.

2. The composition able to improve the thermal insulation of the building wall surfaces according to claim 1, wherein the natural products reed and cork are, each of them, independently, in form of dust with particle size lower than 0.1 mm and are present in an amount from 0.1% to 20% b.w.; that the hollow ceramic microspheres are present in an amount from 50% to 95% b.w; that the pyrogenic silica is present in an amount from 0.1% to 10% b.w. and that hydroxyethylcellulose is present in an amount from 0.1% to 15% b.w. and that said composition is dispersed in a selected painting product.

3. The composition able to improve the thermal insulation of the building wall surfaces according to claim 1, wherein the natural products reed and cork are, each of them, independently, in crumbled form with particle size between 0.1 mm and 3 mm and present in an amount from 5% and 45% b.w.; that the hollow ceramic microspheres are present in an amount from 2.5% to 15% b.w.; that the pyrogenic silica is present in an amount from 0.1% to 20% b.w. and that hydroxyethylcellulose is present in an amount from 0.1% to 20% b.w. and that said composition is mixed with a selected building product.

4. The composition able to improve the thermal insulation of the building wall surfaces according to claim 2, wherein the composition b.w. is made of:
  reed powder 14.0%
  cork powder 14.0%
  hollow ceramic microspheres 65.0%
  pyrogenic silica 1.0%
  hydroxyethylcellulose 6.0%.

5. The composition able to improve the thermal insulation of the building wall surfaces according to claim 2, wherein the composition b.w. is made of:
  reed powder 3.0%
  cork powder 3.0%
  hollow ceramic microspheres 93.6%
  pyrogenic silica 0.1%
  hydroxyethylcellulose 0.3%.

6. The composition able to improve the thermal insulation of the building wall surfaces according to claim 1, wherein the composition is mixed with further products to be utilized on the wall surfaces.

* * * * *